United States Patent
Ammouri et al.

(10) Patent No.: US 8,762,079 B2
(45) Date of Patent: Jun. 24, 2014

(54) METHOD FOR ESTIMATING THE CHARACTERISTIC PARAMETERS OF A CRYOGENIC TANK, IN PARTICULAR THE GEOMETRIC PARAMETERS OF THE TANK

(75) Inventors: Fouad Ammouri, Massy (FR); Florence Boutemy, Paris (FR); Jonathan Macron, Paris (FR)

(73) Assignee: L'air Liquide, Societe Anonyme pour l'etude et l'exploitation des Procedes Georges Claude, Paris (FR)

(*) Notice: Subject to any disclaimer, the term of this patent is extended or adjusted under 35 U.S.C. 154(b) by 1033 days.

(21) Appl. No.: 12/738,395

(22) PCT Filed: Oct. 16, 2008

(86) PCT No.: PCT/FR2008/051866
§ 371 (c)(1),
(2), (4) Date: Apr. 16, 2010

(87) PCT Pub. No.: WO2009/053647
PCT Pub. Date: Apr. 30, 2009

(65) Prior Publication Data
US 2010/0250157 A1 Sep. 30, 2010

(30) Foreign Application Priority Data
Oct. 26, 2007 (FR) ...................................... 07 58608

(51) Int. Cl.
*G01F 23/14* (2006.01)
(52) U.S. Cl.
USPC .................. 702/55; 702/45; 702/50; 702/179; 702/181
(58) Field of Classification Search
USPC ............ 702/55, 45, 50, 181, 179; 700/14–15, 700/281; 340/618, 606, 612, 614; 73/290 R, 73/301–302
See application file for complete search history.

(56) References Cited

U.S. PATENT DOCUMENTS 3,371,534 A 3/1968 Akely
4,602,344 A 7/1986 Ferretti et al.
(Continued)

FOREIGN PATENT DOCUMENTS

CA 2 397 029 8/2002
EP 1 191 276 3/2002
(Continued)

OTHER PUBLICATIONS

International Search Report for PCT/FR2008/051866.
(Continued)

*Primary Examiner* — Jonathan C Teixeira Moffat
*Assistant Examiner* — Hien Vo
(74) *Attorney, Agent, or Firm* — Elwood L. Haynes

(57) ABSTRACT

(EN) The invention relates to a method for estimating the characteristic parameters of a cryogenic tank (1), in particular geometric parameters, including: a step comprising the measurement of the pressure differential between the upper and lower parts of the tank prior to filling $DP_{mes\_before}$; a step comprising the measurement of the pressure differential between the upper and lower parts of the tank after filling $DP_{mes\_after}$; a step comprising the determination of the mass of liquid delivered ($m_{delivered}$) during filling; and a step comprising the calculation of a first geometric parameter (R) of the tank, namely the radius (R) which is calculated from equation (I), wherein g is the Earth's gravitational acceleration and MAVO is a density coefficient that is a function of the density of the liquid and the gas in the tank and optionally in the pressure measuring pipes (11) when the pressure differential is measured by at least one remote pressure sensor connected to the upper and lower parts of the tank via respective measuring tubes (11).

16 Claims, 1 Drawing Sheet

(56) References Cited

U.S. PATENT DOCUMENTS

| | | |
|---|---|---|
| 4,782,451 A | 11/1988 | Mazzarella et al. |
| 6,064,311 A | 5/2000 | Ferenczi et al. |
| 6,345,214 B1 | 2/2002 | Dulphy-Vigor et al. |
| 2004/0236536 A1 | 11/2004 | Neeser et al. |
| 2010/0241371 A1 | 9/2010 | Ammouri et al. |

FOREIGN PATENT DOCUMENTS

| | | |
|---|---|---|
| EP | 1 286 105 | 2/2003 |
| EP | 1 406 053 | 4/2004 |
| EP | 1 712 831 | 10/2006 |
| FR | 1 481 242 | 5/1967 |
| FR | 2 554 230 | 5/1985 |
| FR | 2 765 205 | 12/1998 |
| FR | 2 765 326 | 12/1998 |
| FR | 2 811 752 | 1/2002 |
| FR | 2 841 963 | 1/2004 |

OTHER PUBLICATIONS

International Search Report for co-pending PCT/FR2008/051868.
PCT/FR2008/051866, Written Opinion of the International Searching Authority, Mar. 31, 2009.
PCT/FR2008/051868, Written Opinion of the International Searching Authority, Jul. 10, 2009.
PCT/FR2008/051911, Written Opinion of the International Searching Authority, Apr. 17, 2009.
International Search Report for PCT/FR2008/051911 dated Apr. 17, 2009.
French Search Report for FR 0702930 dated Apr. 24, 2008.

METHOD FOR ESTIMATING THE CHARACTERISTIC PARAMETERS OF A CRYOGENIC TANK, IN PARTICULAR THE GEOMETRIC PARAMETERS OF THE TANK

This application is a 371 of international PCT Application PCT/FR2008/051866, filed Oct. 16, 2008, the entire contents of which are incorporated herein by reference.

FIELD OF THE INVENTION

The present invention relates to a method for estimating characteristic parameters of a cryogenic tank and in particular geometric parameters of the tank.

The invention in particular makes it possible to improve the level measurement in cryogenic tanks in order to improve the efficiency of the logistic supply chain for supplying these tanks with liquid. The tanks concerned comprise an internal fluid-storage tank (or internal barrel) placed inside an external tank (or outer barrel). These two barrels are separated by a layer of insulation. The tanks store cryogenic liquids such as oxygen, argon, nitrogen with capacities of 100 liters to 100 000 liters, for example. The storage pressures may range between 3 bar and 35 bar.

BACKGROUND

The geometric parameters of an (internal) tank are needed notably in order notably to estimate the level of liquid and the quantity that can be delivered into the tank. Among the useful parameters, mention may notably be made (in the case of a cylindrical tank with elliptical ends) of: the radius R, the total height of the tank ($h_{tot}$), the height F of the elliptical part (end), the maximum height of liquid $H_{max}$. For many cryogenic tanks, these parameters are unknown or can be identified only at the expense of significant work.

It is an object of the present invention to alleviate all or some of the abovementioned disadvantages of the prior art.

SUMMARY OF THE INVENTION

The invention relates to a method for estimating the characteristic parameters of a cryogenic tank, in particular geometric parameters, including: a step comprising the measurement of the pressure differential between the upper and lower parts of the tank prior to filling $DP_{mes\_before}$; a step comprising the measurement of the pressure differential between the upper and lower parts of the tank after filling $DP_{mes\_after}$; a step comprising the determination of the mass of liquid delivered ($M_{delivered}$), during filling; and a step comprising the calculation of a first geometric parameter (R) of the tank, namely the radius (R) which is calculated from equation (I), wherein g is the Earth's gravitational acceleration and MAVO is a density coefficient that is a function of the density of the liquid and the gas in the tank and optionally in the pressure measuring pipes when the pressure differential is measured by at least one remote pressure sensor connected to the upper and lower parts of the tank via respective measuring tubes.

DETAILED DESCRIPTION OF THE INVENTION

Figure 1:
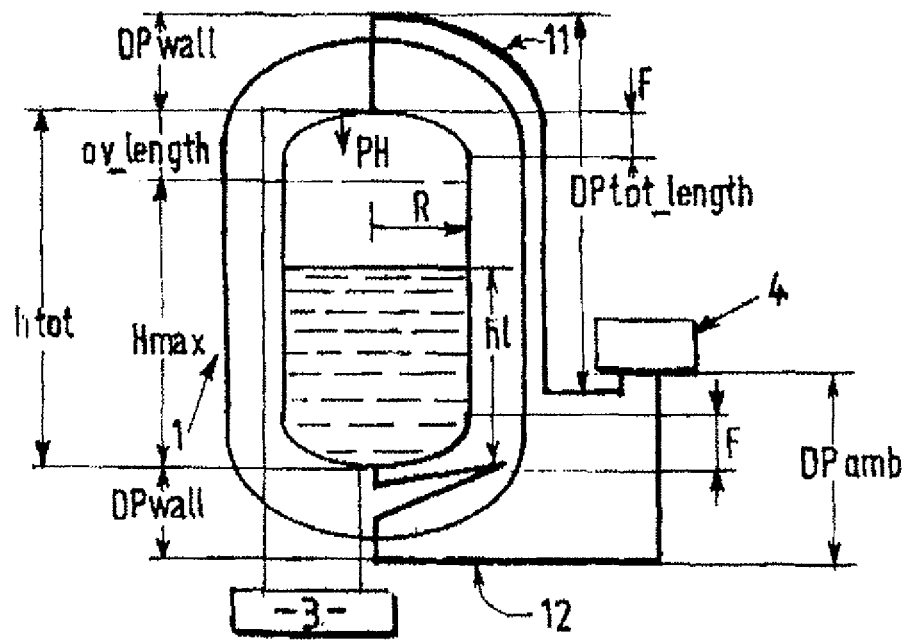
FIG. 1 provides a schematic view illustrating a first example of a cryogenic tank for implementing the invention with the pipework outside the walls of the tank.

To this end, the method according to the invention, in other respects in accordance with the generic definition given thereof in the above preamble, is essentially characterized in that it comprises a step of calculating a first geometric parameter (R) of the tank as a function of:
- a mass of liquid delivered ($m_{delivered}$) (in kg) determined during the filling,
- the difference between the pressure differentials ($DP_{mes}$) (in Pa) measured before and after filling ($DP_{mes\_after} - DP_{mes\_before}$), each pressure differential measuring the pressure differential between the top and bottom parts of the tank,
- the densities of the gas and of the liquid ($\rho_g$, $\rho_l$) in the tank (in kg/m³).

Unless stated otherwise, the physical parameters are expressed in SI units: distances (notably heights, radii, etc.) are expressed in meters (m), densities in kg/m³, volumes in m³, pressures or pressure differentials in Pa.

Furthermore, some embodiments of the invention may comprise one or more of the following features:
- the tank comprises a cylindrical portion and at least one end having an elliptical portion of set height (F) (in m), and in that the first geometric parameter is the radius (R) (in m) of the cylinder,
- the radius (R) is calculated using an equation of the type:

$$R = \sqrt{\frac{m_{delivered} g [1 - (MAVO)]}{\pi(DP_{mes\_after} - DP_{mes\_before})}}$$

in which g is the acceleration due to gravity of the Earth, in m/s² and MAVO is a dimensionless corrective coefficient that is a function of the density of the liquid and of the gas in the tank and possibly in the pressure measurement pipework when the pressure differential is measured by at least one remote pressure sensor connected to the top and bottom parts of the tank via respective measurement pipes, and π is the number Pi

- in order to estimate the density coefficient (MAVO), the method uses at least one of the following assumptions:
  - the density of the liquid in the tank $\rho_l$ is considered to be equal to the mean of the densities of the liquid before $\rho_{l\_before}$ and after $\rho_{l\_after}$ filling,
  - the density of the liquid before filling $\rho_{l\_before}$ is equal to the density at equilibrium at the pressure of the tank,
  - the density of the liquid after filling $\rho_{l\_after}$ is equal to the mean of, on the one hand, the density of the liquid at equilibrium at the pressure of the tank before filling weighted by the fraction of the volume occupied by this liquid and, on the other hand, the density of the liquid in the truck considered at equilibrium at the pressure of the truck, weighted by the fraction of the volume available in the tank before filling,
  - the volume of the liquid in the tank before filling is considered to be equal to a known fraction (for example 30%) of the maximum volume of liquid in the tank,
  - the density of the gas in the tank $\rho_g$ is calculated at the pressure of the tank $P_{tank}$ and for a temperature that is increased over the equilibrium temperature at the pressure of the tank (for example increased by 20 K),
  - the measured pressure differential $DP_{mes}$ is corrected to take account of an additional pressure difference value ($DP_{pipe}$) created by the gas present in the measurement pipes in the event of remote measurement, the volume of the liquid $V_l$ in a cylindrical tank of radius R having one elliptical end of height F is given by the relationship:

If $h_l \geq F \Rightarrow V_l = \pi R^2 \left[ h_l - \dfrac{F}{3} \right]$

If $h_l < F \Rightarrow V_l = \dfrac{2}{3}\pi F R^2 - \pi(F - h_l)\left[ R^2 - \dfrac{R^2}{3F^2}(F - h_l)^2 \right]$ $h_l$ being the height of liquid in the tank, the method comprises a step of calculating a second geometric parameter consisting of the height (F) of the elliptical portion of the tank as a function of calculated value of radius (R), the value of the height (F) of the elliptical portion being given by the following equation:

$$\dfrac{R}{F} = K$$

K being a known dimensionless constant representative of a type of tank or an arbitrarily chosen constant such as about 1.95, the method comprises a step of calculating a third geometric parameter consisting of the total height of the tank ($h_{tot}$) from the pressure differential (in Pa) measured just after a filling $DP_{mes\_after}$ assuming that filling is total, this measured pressure differential being expressed in the following form:

$$DP_{mes\_after} = A_0 H_{max} + A_1 h_{tot} + A_2 h_{g\_before} + A_3 h_{l\_before}$$

in which $A_0, A_1, A_2, A_3$ are coefficients (in Pa/m) dependent on the densities of the gas and of the liquid before and after filling, $H_{max}$ is the maximum height of liquid in the tank, $h_{g\_before}$ being the height of gas in the tank before filling, $h_{l\_before}$ being the height of liquid in the tank before filling, and using the following assumption: the height of liquid in the tank before filling $h_{l\_before}$ is estimated at a known set threshold FS expressed as a percentage of the maximum height of liquid $H_{max}$, the height $h_{g\_before}$ of gas before filling being deduced therefrom as being the complement:

$$h_{l\_before} = FS\, H_{max}$$

$$h_{g\_before} = h_{tot} - FS\, H_{max}$$

the method comprises a step of calculating a fourth geometric parameter consisting of the maximum height of liquid $H_{max}$, this being deduced the total height of the tank calculated from the following equation:

$$H_{max} = \dfrac{F}{3} + \dfrac{V_{max}}{V_{tot}}\left[ h_{tot} - \dfrac{2F}{3} \right]$$

the method comprises a step of calculating a fifth geometric parameter consisting of the thermal loss of the tank, said thermal loss expressed as an oxygen percentage (% $O_2$) of oxygen lost per day being approximated using a relationship of the type:

$$\%\, O_2\ \text{lost per day} = p_1 V_{tot}^{-p_2}$$

in which $V_{tot}$ is the total volume of the tank, $p_1$ is a coefficient of the order of 0.6 and preferably equal to 0.65273 and $p_2$ is a coefficient of the order of 0.3 and preferably equal to 0.37149, the method comprises a step of collecting a plurality of values for the mass of liquid delivered ($m_{delivered}$) which are determined respectively during a plurality of fillings of the tank, and a step of calculating, for each value of mass of liquid delivered ($m_{delivered}$), the fill ratio r $$r = \dfrac{m_{delivered}}{DP_{mes\_after} - DP_{mes\_before}} = \text{constant (in kg/Pa)}$$

and the method of estimating uses only those values of mass of liquid delivered ($m_{delivered}$) for which the absolute value of the fill ratio r differs with respect to a set constant reference value by no more than a fixed threshold amount, the set constant reference value for the fill ratio r consists of the mean of this fill ratio r calculated for a plurality of fillings.

Figure 2:
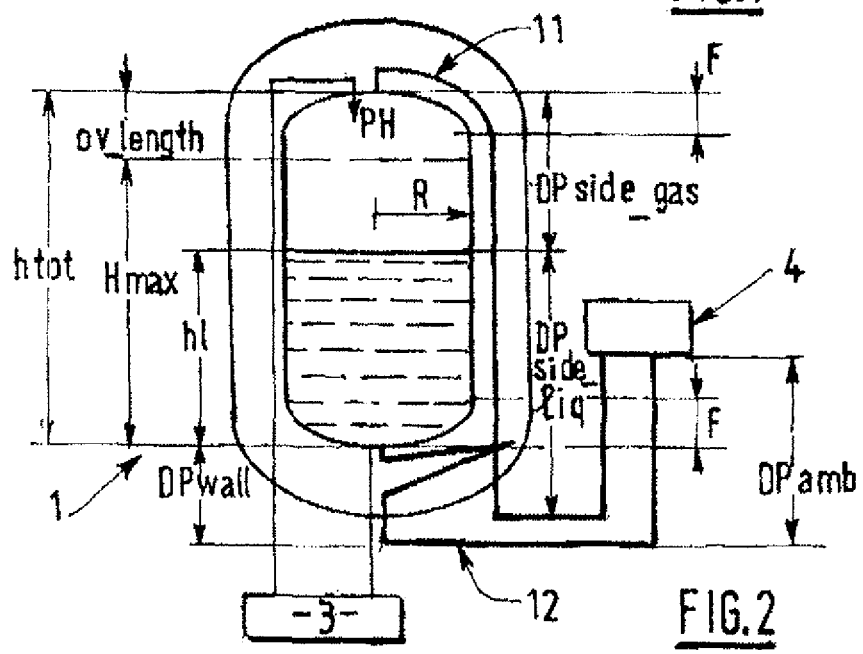
FIG. 2 provides a schematic view illustrating a second example of a cryogenic tank for implementing the invention with the pipework inside the walls of the tank.

Other specific features and advantages will become apparent from reading the following description given with reference to the figures in which:

FIG. 1 depicts a schematic view illustrating a first example of a cryogenic tank for implementing the invention (pipework outside the walls of the tank), FIG. 2 depicts a schematic view illustrating a second example of a cryogenic tank for implementing the invention (pipework inside the walls of the tank).

The method that is to be described hereinafter can be implemented by a computer of a (local or remote) tank control system. This method involves measuring a pressure and a pressure difference $DP_{mes}$ and may comprise remote transmission of data. The pressures are measured via pipework 11, 12 which may lie in the space between the walls of the tank (FIG. 2) or on the outside 11 (FIG. 1).

The tank 1 may comprise a pressurizing device such as a vaporization heater 3 able to tap off liquid, vaporize it, and reinject it into the tank. This heater 3 regulates the pressure within the tank 1 in the conventional way.

For simplicity, the interior tank which stores the fluid will hereinafter simply be termed the "tank".

The liquid supplied by a delivery truck during filling operations may also be considered to be in the state of equilibrium (temperature range of 10 K around equilibrium, for example 77.2 to 87.9 K in the case of nitrogen). The pressure of the liquid in the delivery truck is chosen, according to the pressure of the tank, to be between 1 and 2 bar. The liquid is introduced into the tank by pumping it.

Between two filling operations the tank 1 is subjected to the following phenomena:

the quantity of liquid decreases (is consumed by the user), and the corresponding drop in pressure is corrected by the heater 3, heat enters the tank through the walls of the tank and the heater (conduction, radiation).

After a certain time at equilibrium, liquid vaporizes in the tank and this contributes to a loss of liquid. In addition, the density of the liquid decreases as the liquid heats up and, as a result, the liquid level is higher than if it had maintained its delivery temperature.

According to an advantageous particular feature, temperatures specific to the gas and to the liquid in the tank are considered, but without these temperatures being a function of the location within the tank. What that means to say is that in what follows, the temperatures of the gas $T_g$ and of the liquid $T_l$ are mean temperatures.

The estimated liquid level is based on the pressure differential $DP_{mes}$ measured between the bottom and top ends of the tank.

According to the present method, the calculated height of liquid $h_{l1}$ is calculated (in Pa) according to the formula (equation 1):

$$h_{l1} = \frac{DP_{mes}}{\rho_{l1} g}$$

Where $\rho_{l1}$ is a calibration liquid density value (in kg/m$^3$) that is constant (but can be modified by an operator); g being the acceleration due to gravity of the Earth in m/s$^2$.

Because the tank is not a geometrically perfect cylinder (its ends are elliptical, cf. FIGS. 1 and 2), the volume $V_l$ of liquid uses two equations according to whether the liquid level is below or above the elliptical part F (equations 2):

If $h_{l1}$ is above the elliptical zone F $$\text{then} \Rightarrow V_l = \pi R^2 \left[ h_{l1} - \frac{F}{3} \right]$$

$$\text{else} \Rightarrow V_l = \frac{2}{3} \pi F R^2 - \pi (F - h_{l1}) \left[ R^2 - \frac{R^2}{3F^2}(F - h_{l1})^2 \right]$$

R being the radius (in m) of the tank (in its cylindrical portion).

The mass of liquid contained in the tank $m_l$ is deduced using the density of the liquid $\rho_{l1}$ (equation 3):

$$m_l = \rho_{l1} V_l$$

The mass of liquid $m_1$ can be expressed as a function of the measured pressure differential $DP_{mes}$.

For preference, according to one possible advantageous feature of the invention, the calculated liquid level $h_l$ is corrected taking account of an additional pressure difference value $DP_{pipe}$ created by the gas present in the measurement pipes 11, 12, both when the pipes 11 are situated inside the tank (FIG. 2) and outside the tank (FIG. 1).

What that means to say is that the pressure sensors 4 are remote and "read" pressures that are influenced by the fluid in the pipework 11, 12 connecting them to the top and bottom parts of the tank.

The pressure differential $DP_{mes}$ measured remotely between the top and bottom parts of the tank being connected to the so-called "real" pressure differential $DP_{real}$ between the top and bottom parts of the tank according to the formula:

$$DP_{mes} = DP_{real} - DP_{pipe}$$

Scenario in which the piping is outside the wall of the tank (FIG. 1):

$DP_{wall}$ is the pressure differential between the two ends of the vertical pipework running through the space between the walls (at the top or at the bottom).

$DP_{tot\_length}$ is the pressure difference due to the pressure of gas in the part of pipework 11 connecting the uppermost point to the remote measurement member 4 (sensor).

$DP_{amb}$ is the pressure difference due to the pressure of gas in the part of pipework 11 connecting the lowermost point to the remote measurement member 4 (sensor).

The pressure differential $DP_{wall}$ between the two ends of the vertical piping passing through the space between the walls (at the top or at the bottom) can be considered to be substantially identical at the top and at the bottom (only the fact of gas in the pipework). Considering the shape of the lower pipework 12 in the space between the walls: the pipework runs close to the outer barrel to "pick up" heat energy external to the tank and completely vaporize the fluid in the measurement pipework 12. Between the upper and lower ends of this portion, the pressure is substantially the same (with a differential of 0.5 bar at most).

Scenario in which the pipework is in the space between the walls (FIG. 2):

$DP_{side\_gas}$ is the pressure difference in the part of the pipe connected to the top part of the tank and on the gas side of the tank (containing gas), $DP_{side\_liq}$ is the pressure difference in the part of the upper pipe lying on the liquid side of the tank (containing liquid).

The total mass $m_{tot}$ of fluid in the tank (liquid and gas) can be expressed as a function of data including, notably:

- the measured pressure differential $DP_{mes}$ between the top and bottom parts of the tank (in Pa),
- the density of the liquid in the tank $\rho_l$,
- the density of the gas in the tank $\rho_g$,
- the density of the gas in the pipe 11 on the gas side of the tank measuring the pressure in the top part of the tank $\rho_{side\_gas}$,
- the density of the gas in the pipe 11 on the liquid side of the tank measuring the pressure in the top part of the tank $\rho_{side\_liquid}$,
- the acceleration due to gravity of the Earth g,
- the radius R of the tank,
- the height of the elliptical part F,
- the total height of the tank $h_{tot}$
- the total mass $m_{tot}$ of fluid in the tank can be expressed in the form of an equation of the type given below, which will be justified in greater detail hereinafter:

$$m_{tot} = \pi R^2 \left[ \frac{DP_{mes}}{g} \left( \frac{\rho_l - \rho_g}{\rho_l - \rho_g + \rho_{side\_gas} - \rho_{side\_liquid}} \right) - \frac{F}{3}(\rho_l + \rho_g) + \left( \frac{\rho_{side\_gas}\rho_l - \rho_{side\_liquid}\rho_g}{\rho_l - \rho_g + \rho_{side\_gas} - \rho_{side\_liquid}} \right) h_{tot} \right] \quad \text{(equation 101)}$$

This equation can be applied both before and after a filling of the tank.

It can be assumed that the densities of the gas and of the liquid are constant before filling and after filling and equal to their mean values. Thus, by applying this formula 101 to the states before $m_{tot}$(before) and after $m_{tot}$(after) filling, the mass of liquid delivered $m_{delivered}$ can be expressed as $m_{delivered} = m_{tot}$(after) $- m_{tot}$(before) and the geometric unknowns F and $h_{tot}$ thus eliminated. In this way, the mass delivered (in theory known at the time of the delivery) can be expressed solely as a function of the pressure differentials $DP_{mes}$ measured before and after filling $DP_{mes\_before}$ and $DP_{mes\_after}$ and of the radius R (which is unknown).

Thus, the radius R can be expressed solely as a function of the mass delivered, of the densities of the gas and of the liquid and of the pressure differentials, in the following form (equation 102):

$$R = \sqrt{\frac{m_{delivered} g \left[1 - \left(\frac{\rho_{side\_liquid} - \rho_{side\_gas}}{\rho_l - \rho_g}\right)\right]}{\pi(DP_{mes\_after} - DP_{mes\_before})}}$$

However, it should be pointed out that, in practice, the operators' delivery notes are not always reliable in terms of the mass of liquid actually delivered $m_{delivered}$. Specifically, errors may be due to incorrect transcription by the operator and/or losses of liquid during handling. Thus, any inaccuracy in the delivered mass $m_{delivered}$ may introduce error into the estimate of the radius R of the tank. To address this problem, one particular method described hereinbelow can be used in order to use only the reliable values of delivered mass $m_{delivered}$.

If the densities of the gas $\rho_g$ and of the liquid $\rho_l$ are considered to be constant before and after filling and equal to their mean values, then the ratio r between, on the one hand, the mass delivered and, on the other hand, the difference between the pressure differentials $DP_{mes}$ measured before and after filling ($DP_{mes\_after} - DP_{mes\_before}$) is constant.

Put differently (equation 103):

$$r = \frac{m_{delivered}}{DP_{mes\_after} - DP_{mes\_before}} = \text{constant (in kg/Pa)}$$

Thus, in order to select the reliable delivered masses, for each delivery note the method may:
1) calculate this ratio for each filling
2) calculate the relative difference between this ratio r and the mean value $r_{mean}$ of this ratio
3) select those delivery notes (delivered masses) which, in terms of absolute value, do not deviate excessively from the mean $r_{mean}$ (for example do not exhibit more than 10% divergence).

For preference, only these data are used for calculating the radius (equation 102).

The density of the liquid in the tank $\rho_l$ is considered to be equal to the mean of the densities of the liquid before $\rho_{l\_before}$ and after $\rho_{l\_after}$ filling (equation 104):

$$\rho_l = \frac{\rho_{l\_before} + \rho_{l\_after}}{2}$$

It is also assumed that the density of the liquid before filling $\rho_{l\_before}$ is equal to the density at equilibrium at the pressure of the tank (equation 105):

$$\rho_{l\_before} = \rho_{l\_eq\_tank}$$

It is assumed that the density of the liquid after filling $\rho_{l\_after}$ is equal to the mean of, on the one hand, the density of the liquid at equilibrium at the pressure of the tank before filling weighted by the fraction of the volume occupied by this liquid and, on the other hand, the density of the liquid in the truck considered at equilibrium at the pressure of the truck weighted by the fraction of the volume available in the tank before filling. This leads to (equation 106):

$$\rho_{l\_after} = 0.7 * \rho_{l\_eq\_truck} + 0.3 * \rho_{l\_eq\_tank}$$

The density of the gas in the tank $\rho_g$ is calculated at the pressure of the tank $\rho_{tank}$ and for a temperature 20 K higher than the equilibrium temperature. Specifically, the gas in the tank is heated up after filling by comparison with its equilibrium temperature (is approximately 40 K above equilibrium) just before the next filling. The 20 K value is a mean that may advantageously be chosen.

This then yields the next expression (equation 107 which gives the density of the gas as calculated as a function of a number of parameters):

$$\rho_g = \rho_g(T_g = T_{eq\_tank} + 20K, P_{tank})$$

The density $\rho_{side\_gas}$ of the gas in the pipework 11 connecting the top part of the tank and situated inside the tank (in the space between the walls), that is to say the gas situated in the pipework on the gas side of the tank can be calculated at the pressure of the tank and at a temperature $T_{gg}$ given by the following formula (equation 108):

$$\begin{cases} T_{gg} = T_g + \frac{d\_pipe}{w\_length}(T_{amb} - T_g) & \text{if the pipework is on the outside} \\ T_{gg} = T_{amb} & \text{if the pipework is on the inside} \end{cases}$$

Where:
d_pipe=the distance (spacing) between the upper pipework 11 and the wall of the interior tank,
w_length=the thickness of the insulation of the internal tank, and
$T_{amb}$=the ambient temperature around the tank.

In the case of pipework 11 situated inside (in the space between the walls), it is possible to consider a linear temperature profile through the thickness of the insulation. In the case of external pipework 11, the temperature of the gas in the pipework 11 is considered to be equal to that of ambient temperature.

The density $\rho_{side\_liquid}$ of the gas in the pipework 11 on the side of the liquid phase in the tank is calculated at the current pressure of the tank and at a temperature $T_{gl}$ using the following relationship (equation 109):

$$\begin{cases} T_{gl} = T_l + \frac{d\_pipe}{w\_length}(T_{amb} - T_l) & \text{if the pipework is in the space between the walls} \\ T_{gl} = T_{amb} & \text{if the pipework is outside the walls} \end{cases}$$

Likewise, for pipework 11 inside the tank on the same side as the liquid phase contained in the tank, consideration is given to a temperature profile that is linear between the liquid situated in the tank and the ambient temperature on the outside around the tank.

The volume of the liquid $V_l$ in a cylindrical tank of radius R and having an elliptical end of height F is given by the relationship (equation 110):

$$\text{If } h_l \geq F \Rightarrow V_l = \pi R^2 \left[h_l - \frac{F}{3}\right]$$

$$\text{If } h_l < F \Rightarrow V_l = \frac{2}{3}\pi F R^2 - \pi(F - h_l)\left[R_2 - \frac{R^2}{3F^2}(F - h_l)^2\right]$$

(where $h_l$=the height of liquid in the tank).

If the total height of the tank is defined as $h_{tot}$, then we can write (equation 111):

$$h_{tot} = H_{max} + ov\_length$$

Where ov_length=the minimum height of gas in the tank from the top end thereof.

The volume of gas $V_g$ in the tank is the complement of the volume of liquid $V_l$, with respect to the total volume of the tank $V_{tot}$ according to the relationship (equation 112):

$$V_{tot} = \pi R^2 \left( h_{tot} - \frac{2F}{3} \right)$$

$$V_g = V_{tot} - V_l$$

The mass of fluid in the tank is equal to the sum of the liquid and of the gas (equation 113):

$$m_{tot} = \rho_l V_l + \rho_g V_g$$

When $h_l$ is greater than or equal to F (which it is most of the time), using equations 110 and 113, the formula expressing mass can be simplified to give (equation 114):

$$m_{tot} = \pi R^2 \left[ \frac{\frac{DP_{mes}}{g} - \frac{F}{3}(\rho_l + \rho_g) +}{(\rho_{side\_liquid} - \rho_{side\_gas})h_l + \rho_{side\_gas}h_{tot}} \right]$$

The height of liquid in the tank is therefore linked to the differential pressure measurement $DP_{mes}$ according to the following relationship (equation 115):

$$h_l = \frac{\frac{DP_{mes}}{g} - (\rho_g - \rho_{side\_gas})h_{tot}}{\rho_l - \rho_g + \rho_{side\_gas} - \rho_{side\_liquid}}$$

Thus, equations 114 and 115 lead to equation 101 given hereinabove.

The radius R of the tank can thus be calculated and estimated for each plausible value of mass delivered during a filling operation. The mean radius can thus be calculated on the basis of these multiple calculations. This is the first parameter determined from just measuring the pressure differential DP, the mass of liquid delivered, and a few approximations regarding densities.

Calculating the Height F of the Elliptical End Part

This end height F can be deduced directly from the estimated radius R, as the radio between these two geometric parameters is considered to be substantially constant across all tank manufacturers. This second geometric parameter can be deduced (cf. equations 116 hereinbelow for two examples of manufacturer).

$$\frac{R}{F} = 1.9 \text{ for tanks made by ``Cryolor''}$$

$$\frac{R}{F} = 2 \text{ for tanks made by ``Chart''}$$

Where the manufacturer is unknown, the approximation of 1.95 can be used for example.

Estimating the Maximum Height of Liquid and the Total Height ($H_{max}$ and $h_{tot}$).

For most cryogenic tanks, the ratio between the maximum volume of liquid $V_{max}$ and the total volume of liquid $V_{tot}$ is constant and dependent only on the level of pressure in tank. This ratio is 0.95 for tanks at low and medium pressure (ranging between 1 and 15 bar) and is 0.90 for high pressures (in excess of 15 bar), (cf. equation 117):

$$\frac{V_{max}}{V_{tot}} = 0.95 \text{ for tanks at low and medium pressure}$$

$$\frac{V_{max}}{V_{tot}} = 0.90 \text{ for tanks at high pressure}$$

In the knowledge that (equation 118):

$$V_{tot} = \pi R^2 \left[ h_{tot} - \frac{2F}{3} \right]$$

$$V_{max} = \pi R^2 \left[ H_{max} - \frac{F}{3} \right]$$

We obtain (equation 119)

$$H_{max} = \frac{F}{3} + \frac{V_{max}}{V_{tot}} \left[ h_{tot} - \frac{2F}{3} \right]$$

Thus, once the total height $h_{tot}$ is determined the maximum height of liquid $H_{max}$ can be deduced using this last equation (knowing $$\frac{V_{max}}{V_{tot}} \Big)$$

in order thereafter to estimate F.

The total height of the tank is determined and estimated from the pressure differential measured just after a filling $DP_{mes\_after}$ making the assumption that filling is total. In such an event, the measured pressure differential can be expressed in the form (equation 120):

$$DP_{mes\_after} = \rho_{l\_after} H_{max} g + \rho_{g\_after}(h_{tot} - H_{max})g - (\rho_{gg\_before} h_{g\_before} + \rho_{gl\_before} h_{l\_before})g$$

In this equation 120, the densities of gas in the measurement pipework 11 $\rho_{side\_gas\_before}$ and $\rho_{side\_liquid\_before}$ are calculated at the pressure of the tank after filling but with pre-filling temperatures for the gas in the pipework 11 (equation 121):

$$\rho_{side\_gas\_before} = \rho_g(T_{gg\_before}, P_{tank\_after})$$

$$\rho_{side\_liquid\_before} = \rho_g(T_{gl\_before}, P_{tank\_after})$$

This is the result of the thermal inertia of the tank insulation lying in the space between the walls. In actual fact, the characteristic time for the conduction of heat through this thickness of insulation (0.045 m of perlite for example) can be calculated using the following equation (equation 122):

$$\tau = \frac{e^2}{a} = \frac{0.045^2}{8.6 \times 10^{-7}} = 0.66 \text{ hour}$$

Where e=the thickness of insulation and a=the thermal diffusivity of the insulation.

The time required for thermal stability of the gas in the pipework 11 lying inside is at least twice the duration $\tau$ (of the order of about 1.33 hours), which is greater than the mean filling time (which is about 0.4 hours).

The height of liquid in the tank before filling is estimated at 30% of the maximum height of liquid and the height of gas can be deduced therefrom thereafter (equations 123):

$$h_{l\_before} = 0.3 H_{max}$$

$$h_{g\_before} = h_{tot} - 0.3 H_{max}$$

Detecting Complete Fillings

In order to detect whether a filling is complete from the list of data covering a plurality of fillings, it is possible to use the following procedure making the assumption that at least one filling in the list of fillings for which data is available is a complete filling.

1) The maximum pressure differential DP just after a filling and for all fillings is determined.

2) A filling is considered to be a complete or total filling if the relative difference between the pressure differential just after filling and the maximum pressure differential is below a threshold value (for example 5%).

Preferably, only fillings considered to be complete are used for determining the total height of the tank. It must be emphasized that the greater the volume of the tank, the greater the probability of incomplete filling. This can be explained by the fact that the volumes of truck deliveries are limited by the storage capacity of the truck. As a result, the greater the volume that is to be filled, the more necessary it will be to have a great deal of filling data available.

Total Height of the Tank and Estimating the Maximum Liquid Level ($h_{tot}$ and $H_{max}$).

For each filling considered to be complete, the total height is determined using equation 120. Next, the mean value is calculated and this provides the third geometric parameter of the tank.

The maximum height of liquid $H_{max}$ is itself deduced from the total height of the tank using equation 119. That gives a fourth geometric parameter.

For European tanks with a volume of 50 m³ or greater, filling is rarely complete. In such cases, the total height of the tank can be determined on the basis of an overall estimate using the following equation 124 which is based on the previous equation 11.

$$h_{tot} = \frac{V_{tot}}{\pi R^2} + \frac{2F}{3}$$

Thus, the maximum height of liquid $H_{max}$ can be deduced from equation 119.

Estimating Thermal Losses

The thermal losses of the cryogenic tank are generally expressed as percent oxygen lost per day. According to the invention, it would appear to be sufficient to make an overall estimate of this loss (this parameter is less sensitive or important than the total height).

This loss is a function of the type of volume of the tank, and decreases as the volume increases. For example, for a Cryolor tank, a correct approximation is (equation 125)

$$\% \text{ O}_2 \text{ lost per day} = 0.65273 V_{tot}^{-0.37149}$$

Knowing the volume of the tank in m³, this last equation estimates daily thermal losses which is the fifth parameter of the tank. This equation can be used for other types of tank (by other manufacturers).

The method described hereinabove makes it possible to estimate, with good precision, the geometric parameters and thermal loss parameters using simple measurements of pressure differentials, pressures and mass delivered at the time of deliveries.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A computer implemented method of estimating characteristic geometric parameters of a double-walled cryogenic tank having a cylindrical portion that is insulated with or without vacuum comprising:

a step of measuring the pressure differential (in Pa) between the top and bottom parts of the tank before a filling ($DP_{mes\_before}$) using a pressure sensor;

a step of measuring the pressure differential (in Pa) between the top and bottom parts of the tank after said filling ($DP_{mes\_after}$) using the pressure sensor;

a step of determining the mass of liquid delivered ($m_{delivered}$) (in kg) during said filling; and a step of calculating, using a computer processor, a radius (R) of the cylindrical portion, the tank comprising at least one end that has an elliptical portion of set height (F), said radius (R) being calculated from:

the mass of liquid delivered ($m_{delivered}$) (in kg) determined during the filling;

the difference between the pressure differentials ($DP_{mes}$) measured before and after filling ($DP_{mes\_after} - DP_{mes\_before}$); and the densities of the gas and of the liquid ($\rho_g$, $\rho_l$) in the tank, the radius (R) (in m) is calculated using the equation:

$$R = \sqrt{\frac{m_{delivered} g [1 - (MAVO)]}{\pi (DP_{mes\_after} - DP_{mes\_before})}}$$

in which the pressure differentials are expressed in Pa, $\pi$ is the number Pi, g is the acceleration due to gravity of the Earth (in m/s²) and MAVO is a dimensionless corrective coefficient that is a function of the density.

2. The computer implemented method of claim 1, wherein, in order to estimate the density coefficient (MAVO), the method uses at least one of the following assumptions:

the density of the liquid in the tank $\rho_l$ is considered to be equal to the mean of the densities of the liquid before $\rho_{l\_before}$ and after $\rho_{l\_after}$ filling, the density of the liquid before filling $\rho_{l\_before}$ is equal to the density at equilibrium at the pressure of the tank, the density of the liquid after filling $\rho_{l\_after}$ is equal to the mean of, on the one hand, the density of the liquid at equilibrium at the pressure of the tank before filling weighted by the fraction of the volume occupied by this liquid and, on the other hand, the density of the liquid in the truck considered at equilibrium at the pressure of the truck, weighted by the fraction of the volume available in the tank before filling, the volume of the liquid in the tank before filling is considered to be equal to a known fraction (for example 30%) of the maximum volume of liquid in the tank, the density of the gas in the tank $\rho_g$ is calculated at the pressure of the tank $P_{tank}$ and for a temperature that is increased over the equilibrium temperature at the pressure of the tank (for example increased by 20 K), the measured pressure differential $DP_{mes}$ is corrected to take account of an additional pressure different value ($DP_{pipe}$) created by the gas present in the measurement pipes in the event of remote measurement.

3. The computer implemented method of claim 2, wherein the volume of the liquid $V_l$ in a cylindrical tank of radius R having one elliptical end of height F is given by the relationship:

$$\text{If } h_l \geq F \Rightarrow V_l = \pi R^2 \left[ h_l - \frac{F}{3} \right]$$

$$\text{If } h_l < F \Rightarrow V_l = \frac{2}{3}\pi F R^2 - \pi(F-h_l)\left[R^2 - \frac{R^2}{3F^2}(F-h_l)^2\right]$$

$h_l$ being the height of liquid in the tank.

4. The computer implemented method of claim 1, wherein the volume of the liquid $V_l$ in a cylindrical tank of radius R having one elliptical end of height F is given by the relationship:

$$\text{If } h_l \geq F \Rightarrow V_l = \pi R^2 \left[ h_l - \frac{F}{3} \right]$$

$$\text{If } h_l > F \Rightarrow V_l = 2\pi F R^2 - \pi(F-h_l)\left[R^2 - \frac{R^2}{3F^2}(F-h_l)^2\right]$$

$h_l$ being the height of liquid in the tank.

5. The computer implemented method of claim 4, wherein the method comprises a step of calculating a second geometric parameter consisting of the height (F) of the elliptical portion of the tank as a function of calculated value of radius (R), the value of the height (F) of the elliptical portion being given by the following equation:

$$\frac{R}{F} = K$$

K being a known constant representative of a type of tank or an arbitrarily chosen constant such as about 1.95.

6. The computer implemented method of claim 1, wherein the method comprises a step of calculating a second geometric parameter consisting of the height (F) of the elliptical portion of the tank as a function of calculated value of radius (R), the value of the height (F) of the elliptical portion being given by the following equation:

$$\frac{R}{F} = K$$

K being a known constant representative of a type of tank or an arbitrarily chosen constant such as about 1.95.

7. The computer implemented method of claim 6, wherein the method comprises a step of calculating a third geometric parameter consisting of the total height of the tank ($h_{tot}$) from the pressure differential measured just after a filling $DP_{mes\_after}$ assuming that filling is total, this measured pressure differential being expressed in the following form:

$$DP_{mes\_after} = A_0 H_{max} + A_1 h_{tot} + A_2 h_{g\_before} + A_3 h_{l\_before}$$

in which $A_0$, $A_1$, $A_2$, $A_3$ are coefficients dependent on the densities of the gas and of the liquid before and after filling, $H_{max}$ is the maximum height of liquid in the tank, $h_{g\_before}$ being the height of gas in the tank before filling, $h_{l\_before}$ being the height of liquid in the tank before filling, and using the following assumption: the height of liquid in the tank before filling $h_{l\_before}$ is estimated at a known set threshold FS expressed as a percentage of the maximum height of liquid $H_{max}$, the height $h_{g\_before}$ of gas before filling being deduced therefrom as being the complement:

$$h_{l\_before} = FS\ H_{max}$$

$$h_{g\_before} = h_{tot} - FS\ H_{max}.$$

8. The computer implemented method of claim 1, wherein the method comprises a step of calculating a third geometric parameter consisting of the total height of the tank ($h_{tot}$) from the pressure differential measured just after a filling $DP_{mes\_after}$ assuming that filling is total, this measured pressure differential being expressed in the following form:

$$DP_{mes\_after} = A_0 H_{max} + A_1 h_{tot} + A_2 h_{g\_before} + A_3 h_{l\_before}$$

in which $A_0$, $A_1$, $A_2$, $A_3$ are coefficients dependent on the densities of the gas and of the liquid before and after filling, $H_{max}$ is the maximum height of liquid in the tank, $h_{g\_before}$ being the height of gas in the tank before filling, $h_{l\_before}$ being the height of liquid in the tank before filling, and using the following assumption: the height of liquid in the tank before filling $h_{l\_before}$ is estimated at a known set threshold FS expressed as a percentage of the maximum height of liquid $H_{max}$, the height $h_{g\_before}$ of gas before filling being deduced therefrom as being the complement:

$$h_{l\_before} = FS\ H_{max}$$

$$h_{g\_before} = h_{tot} - FS\ H_{max}.$$

9. The computer implemented method of claim 8, wherein the method comprises a step of calculating a fourth geometric parameter consisting of the maximum height of liquid $H_{max}$, this being is deduced the total height of the tank calculated from the following equation:

$$H_{max} = \frac{F}{3} + \frac{V_{max}}{V_{tot}}\left[h_{tot} - \frac{2F}{3}\right].$$

10. The computer implemented method of claim 9, wherein the method comprises a step of calculating a fifth geometric parameter consisting of the thermal loss of the tank, said thermal loss expressed as an oxygen percentage (% $O_2$) of oxygen lost per day being approximated using a relationship of the type:

$$\%\ O_2\ \text{lost per day} = p_1 V_{tot}^{-p_2}$$

in which $V_{tot}$ is the total volume of the tank, $p_1$ is a coefficient of the order of 0.6 and preferably equal to 0.65273 and $p_2$ is a coefficient of the order of 0.3 and preferably equal to 0.37149.

11. The computer implemented method of claim 1, wherein the method comprises a step of calculating a fifth geometric parameter consisting of the thermal loss of the tank, said thermal loss expressed as an oxygen percentage (% $O_2$) of oxygen lost per day being approximated using a relationship of the type:

$$\%\ O_2\ \text{lost per day} = p_1 V_{tot}^{-p_2}$$

in which $V_{tot}$ is the total volume of the tank, $p_1$ is a coefficient of the order of 0.6 and preferably equal to 0.65273 and $p_2$ is a coefficient of the order of 0.3 and preferably equal to 0.37149.

12. The computer implemented method of claim 11, wherein the method comprises a step of collecting a plurality of values for the mass of liquid delivered ($m_{delivered}$) which are determined respectively during a plurality of fillings of the tank, a step of calculating, for each value of mass of liquid delivered ($m_{delivered}$), the fill ratio r $$r = \frac{m_{delivered}}{DP_{mes\_after} - DP_{mes\_before}} = \text{constant}$$

and in that the method of estimating uses only those values of mass of liquid delivered ($m_{delivered}$) for which the absolute value of the fill ratio r differs with respect to a set constant reference value by no more than a fixed threshold amount.

13. The computer implemented method of claim 1, wherein the method comprises a step of collecting a plurality of values for the mass of liquid delivered ($m_{delivered}$) which are determined respectively during a plurality of fillings of the tank, a step of calculating, for each value of mass of liquid delivered ($m_{delivered}$), the fill ratio r $$r = \frac{m_{delivered}}{DP_{mes\_after} - DP_{mes\_before}} = \text{constant}$$

and in that the method of estimating uses only those values of mass of liquid delivered ($m_{delivered}$) for which the absolute value of the fill ratio r differs with respect to a set constant reference value by no more than a fixed threshold amount.

14. The computer implemented method of claim 13, wherein the set constant reference value for the fill ratio r consists of the mean of this fill ratio r calculated for a plurality of fillings.

15. The computer implemented method of claim 14, wherein when the measured pressure differentials (DP) do not correspond to the real pressure differentials, that is to say when the pressure is measured remotely via measurement pipes (11, 12) situated inside the tank in the space between the walls, thus creating an additional pressure difference, the coefficient MAVO is given by the formula $$MAVO = \frac{\rho_{side\_liquid} - \rho_{side\_gas}}{\rho_l - \rho_g}$$

wherein:
$\rho_l$=the density of the liquid in the tank,
$\rho_g$=the density of the gas in the tank,
$\rho_{side\_gas}$=the density of the gas in the pipe on the gas side of the tank measuring the pressure in the top part of the tank,
$\rho_{side\_liquid}$=the density of the gas in the pipe on the liquid side of the tank measuring the pressure in the top part of the tank,
and in that when the measured pressure differentials DP do correspond to the real pressure differentials (e.g.: when the pressures are measured remotely via measurement pipes (11, 12) situated on the outside of the tank and at ambient temperature $\rho_{side\_liquid}=\rho_{side\_gas}$), the coefficient MAVO=0 (zero).

16. The computer implemented method of claim 1, wherein when the measured pressure differentials (DP) do not correspond to the real pressure differentials, that is to say when the pressure is measured remotely via measurement pipes (11, 12) situated inside the tank in the space between the walls, thus creating an additional pressure difference, the coefficient MAVO is given by the formula $$MAVO = \frac{\rho_{side\_liquid} - \rho_{side\_gas}}{\rho_l - \rho_g}$$

wherein:
$\rho_l$=the density of the liquid in the tank,
$\rho_g$=the density of the gas in the tank,
$\rho_{side\_gas}$=the density of the gas in the pipe on the gas side of the tank measuring the pressure in the top part of the tank,
$\rho_{side\_liquid}$=the density of the gas in the pipe on the liquid side of the tank measuring the pressure in the top part of the tank,
and in that when the measured pressure differentials DP do correspond to the real pressure differentials (e.g.: when the pressures are measured remotely via measurement pipes situated on the outside of the tank and at ambient temperature $\rho_{side\_liquid}=\rho_{side\_gas}$), the coefficient MAVO=0 (zero).

* * * * *